US008369621B2

(12) United States Patent
Nomura

(10) Patent No.: US 8,369,621 B2
(45) Date of Patent: Feb. 5, 2013

(54) IMAGE PROCESSING APPARATUS, IMAGE PROCESSING METHOD AND PROGRAM

(75) Inventor: Yoshikuni Nomura, Tokyo (JP)

(73) Assignee: Sony Corporation, Tokyo (JP)

( * ) Notice: Subject to any disclaimer, the term of this patent is extended or adjusted under 35 U.S.C. 154(b) by 784 days.

(21) Appl. No.: 12/545,389

(22) Filed: Aug. 21, 2009

(65) Prior Publication Data

US 2010/0054611 A1 Mar. 4, 2010

(30) Foreign Application Priority Data

Aug. 26, 2008 (JP) ................ P2008-216986

(51) Int. Cl.
*G06K 9/46* (2006.01)
(52) U.S. Cl. ....................... 382/190; 382/201
(58) Field of Classification Search ........... 382/190–201
See application file for complete search history.

(56) References Cited

U.S. PATENT DOCUMENTS

| 6,711,293 B1 | 3/2004 | Lowe |  |
| 2008/0013836 A1* | 1/2008 | Nakamura et al. | 382/209 |

FOREIGN PATENT DOCUMENTS

GB 2 272 285 A 5/1994

OTHER PUBLICATIONS

C. Harris et al., "A Combined Corner and Edge Detector", Proc. 4th Alvey Vision Conf., pp. 147-151 (1988).

C. Tomasi et al., "Detection and Tracking of Point Features", Technical Report CMU-CS-91-132 (1991).
W. Freeman et al., "The Design and Use of Steerable Filters", IEEE Trans. Pattern Analysis and Machine Intelligence, vol. 13, No. 9, pp. 891-906 (1991).
F. Schaffaitzky et al., "Multi-view matching for unordered image sets, or "How do I organize my holiday snaps?"", Proc. Seventh European Conf. Computer Vision, pp. 414-431 (2002).
Y. Ke et al, "PCA-SIFT: A More Distinctive Representation for Local Image Descriptors", Computer Vision and Pattern Recognition, 8 pages (2004).

* cited by examiner

*Primary Examiner* — Chan S Park
*Assistant Examiner* — David Perlman
(74) *Attorney, Agent, or Firm* — Finnegan, Henderson, Farabow, Garrett & Dunner, L.L.P.

(57) ABSTRACT

An image processing apparatus includes: a first distribution calculation unit calculating a distribution of luminance gradient vectors in a first local area that includes a feature point on an image; a second distribution calculation unit calculating distributions of the luminance gradient vectors in second local areas close to the feature point on the image; a selection unit comparing the distribution of the luminance gradient vectors of the first local area with the distributions of the luminance gradient vectors of the second local areas to select the most different distribution of the luminance gradient vectors of the second local area; and a feature descriptor calculation unit calculating a feature descriptor at the feature point on the basis of the distribution of the luminance gradient vectors of the first local area and the distribution of the luminance gradient vectors of the second local area selected by the selection unit.

7 Claims, 6 Drawing Sheets

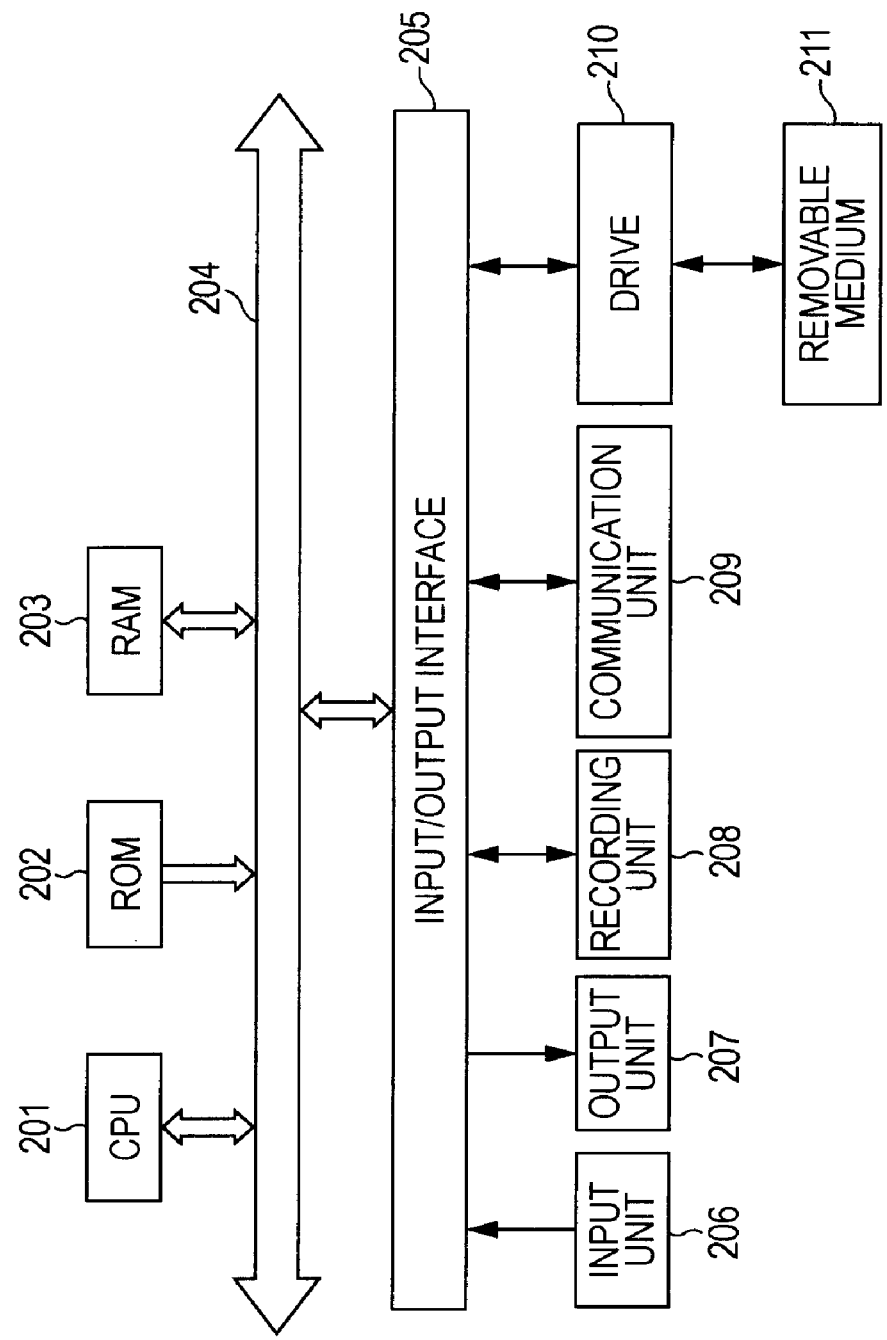

IMAGE PROCESSING APPARATUS, IMAGE PROCESSING METHOD AND PROGRAM

BACKGROUND OF THE INVENTION

1. Field of the Invention

The invention relates to an image processing apparatus, image processing method and program and, more particularly, to an image processing apparatus, image processing method and program that give low calculation cost and that are able to extract a simply usable feature descriptor from an image.

2. Description of the Related Art

An image recognition technique for recognizing a target object in an image is an image processing technique having a wide range of application, and an image recognition method has been widely researched. In an existing art, there are a technique for detecting the position of a feature point in an image and a technique for detecting the feature descriptor at the position of the detected feature point as a technique related to image recognition.

For example, detecting methods, such as a "Harris corner detector", a "SUSAN corner detector" and a "KLT corner detector", are proposed as the technique for detecting the position of a feature point (see, for example, C. Harris and M. Stephens, "A combined corner and edge detector," Proc. 4th Alvey Vision Conf., pp. 147-151, Manchester, U.K., August 1988, the specification of United Kingdom Patent No. GB2272285, and C. Tomasi and T. Kanade, "Detection and Tracking of Point Features" Technical Report CMU-CS-91-132).

In addition, detecting methods using "Steerable filters" or "Complex filters" and detecting methods, such as "SIFT descriptor" and "PCA-SIFT", are proposed as the technique for detecting a feature descriptor (see, for example, W. Freeman and E. Adelson, "The Design and Use of Steerable Filters," IEEE Trans. Pattern Analysis and Machine Intelligence, vol. 13, no. 9, pp. 891-906, September 1991., F. Schaffalitzky and A. Zisserman, "Multi-View Matching for Unordered Image Sets," Proc. Seventh European Conf. Computer Vision, pp. 414-431, 2002., the specification of U.S. Pat. No. 6,711,293, and Y. Ke and R. Sukthankar, "PCA-SIFT: A More Distinctive Representation for Local Image Descriptors", Computer Vision and Pattern Recognition, 2004).

SUMMARY OF THE INVENTION

Incidentally, the feature descriptor used for image recognition is a descriptor of some kind that, when different images each include the same object, can indicate the identity of the object, and the descriptor is usually a vector descriptor.

When the feature descriptor is used for image recognition, the feature descriptor is necessary to have a performance characteristic such that the feature descriptor remains unchanged even when a viewpoint or illumination to an object (feature point) changes and a description characteristic such that how much the feature descriptor is expressed simply by small data amount.

Particularly, the description characteristic of the feature descriptor is further severely set when processing is carried out using the feature descriptor in a mobile device having many restrictions on calculation ability and data capacity or a device having a real-time capability and necessary to have a high processing speed.

However, in the above described techniques, it is difficult to extract a feature descriptor that sufficiently satisfies both the performance characteristic and the description characteristic.

For example, the existing feature descriptors are mostly directed to improving a performance. In the method of detecting a feature descriptor called "SIFT descriptor" as described above, a feature descriptor at one feature point, detected from an image, is expressed by a 128-dimensional vector. Thus, when a similarity between feature descriptors at feature points detected respectively from two images is calculated for comparison, because the feature descriptors are high-dimensional vectors, calculation cost increases. Note that the similarity between the feature descriptors is expressed by a Euclidean distance between the vectors.

In addition, in the method of detecting a feature descriptor called "PCA-SIFT", principal component analysis is carried out on a feature descriptor detected through the "SIFT descriptor" to reduce the number of dimensions of the feature descriptor; however, there is additional calculation cost for principal component analysis to reduce the dimensions. That is, a processing load in a step in which an ultimately used feature descriptor is calculated increases. In this way, when taking into consideration of calculation cost in detecting a feature descriptor, it is necessary to consider two aspects, that is, a processing load necessary for detecting a feature descriptor and a processing load necessary for carrying out image recognition using the detected feature descriptor.

It is desirable to detect, from an image, a simply usable feature descriptor that is robust against a change in viewpoint or illumination and low in calculation cost.

According to an embodiment of the invention, an image processing apparatus includes: first distribution calculation means that calculates a distribution of luminance gradient vectors in a first local area that includes a feature point on an image; second distribution calculation means that calculates distributions of the luminance gradient vectors in second local areas close to the feature point on the image; selection means that compares the distribution of the luminance gradient vectors of the first local area with the distributions of the luminance gradient vectors of the second local areas to select the distribution of the luminance gradient vectors of the second local area of which the distribution is most different from the distribution of the luminance gradient vectors of the first local area from among the distributions of the luminance gradient vectors of the plurality of second local areas; and feature descriptor calculation means that calculates a feature descriptor at the feature point on the basis of the distribution of the luminance gradient vectors of the first local area and the distribution of the luminance gradient vectors of the second local area selected by the selection means.

A luminance gradient histogram may be calculated as a distribution of the luminance gradient vectors to indicate a frequency, which is calculated for each direction of the luminance gradient vector and at which the luminance gradient vector having that direction appears, and the selection means may calculate a similarity of the luminance gradient histogram of each second local area with respect to the luminance gradient histogram of the first local area, and may select the luminance gradient histogram of the second local area, having the lowest degree of similarity indicated by the similarity from among the luminance gradient histograms of the plurality of second local areas.

According to another embodiment of the invention, an image processing method or a program includes the steps of: calculating a distribution of luminance gradient vectors in a first local area that includes a feature point on an image;

calculating distributions of the luminance gradient vectors in second local areas close to the feature point on the image; comparing the distribution of the luminance gradient vectors of the first local area with the distributions of the luminance gradient vectors of the second local areas to select the distribution of the luminance gradient vectors of the second local area of which the distribution is most different from the distribution of the luminance gradient vectors of the first local area from among the distributions of the luminance gradient vectors of the plurality of second local areas; and calculating a feature descriptor at the feature point on the basis of the distribution of the luminance gradient vectors of the first local area and the distribution of the luminance gradient vectors of the selected second local area.

In the embodiment of the invention, a distribution of luminance gradient vectors in a first local area that includes a feature point on an image is calculated, distributions of the luminance gradient vectors in second local areas close to the feature point on the image are calculated, the distribution of the luminance gradient vectors of the first local area is compared with the distributions of the luminance gradient vectors of the second local areas to select the distribution of the luminance gradient vectors of the second local area of which the distribution is most different from the distribution of the luminance gradient vectors of the first local area from among the distributions of the luminance gradient vectors of the plurality of second local areas, and a feature descriptor at the feature point is calculated on the basis of the distribution of the luminance gradient vectors of the first local area and the distribution of the luminance gradient vectors of the selected second local area.

According to the embodiments of the invention, it is possible to detect a feature descriptor from an image. Particularly, according to the embodiments of the invention, it is possible to detect, from an image, a simply usable feature descriptor that is robust against a change in viewpoint or illumination and low in calculation cost.

BRIEF DESCRIPTION OF THE DRAWINGS

FIG. 6 is a block diagram that shows a configuration example of a computer.

DESCRIPTION OF THE PREFERRED EMBODIMENTS

Hereinafter, an embodiment according to the invention will be described with reference to the accompanying drawings.

Figure 1:
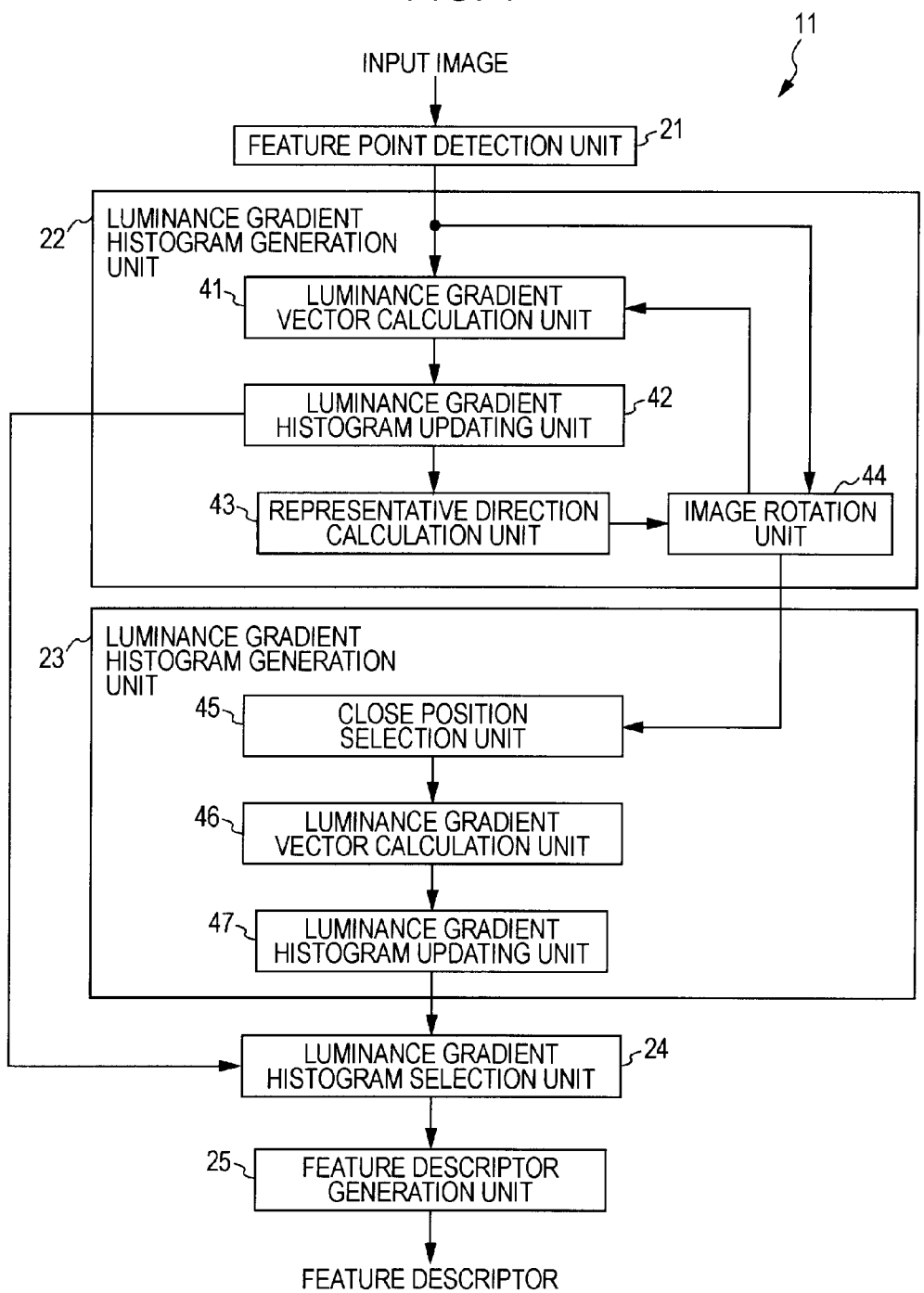
FIG. 1 is a view that shows a configuration diagram of an image processing apparatus according to an embodiment of the invention.

FIG. 1 is a block diagram that shows a configuration example of an image processing apparatus according to the embodiment of the invention.

The image processing apparatus 11 includes a feature point detection unit 21, a luminance gradient histogram generation unit 22, a luminance gradient histogram generation unit 23, a luminance gradient histogram selection unit 24 and a feature descriptor generation unit 25.

An input image, which is a target for detecting a feature descriptor, is supplied to the feature point detection unit 21. The feature point detection unit 21 detects positions of feature points, which are characteristic pixels of the input image, from the supplied input image, and supplies the input image and the detected feature point positions to the luminance gradient histogram generation unit 22.

The luminance gradient histogram generation unit 22 generates a luminance gradient histogram for each feature point position on the basis of the input image and each feature point position supplied from the feature point detection unit 21. The luminance gradient histogram is information that indicates a distribution of luminance gradient vectors of pixels in a local area that includes the feature point, that is, information that indicates a frequency, which is calculated for each of the directions of the luminance gradient vectors and at which luminance gradient vectors having each direction appear.

The luminance gradient histogram generation unit 22 includes a luminance gradient vector calculation unit 41, a luminance gradient histogram updating unit 42, a representative direction calculation unit 43 and an image rotation unit 44.

The luminance gradient vector calculation unit 41 calculates luminance gradient vectors of the pixels in each local area that includes the corresponding feature point position in the input image on the basis of the input image and each feature point position supplied from the feature point detection unit 21 or the input image supplied from the image rotation unit 44, and then supplies the luminance gradient vectors to the luminance gradient histogram updating unit 42.

The luminance gradient histogram updating unit 42 uses the luminance gradient vectors supplied from the luminance gradient vector calculation unit 41 to update the luminance gradient histogram being held, and then generates an ultimate luminance gradient histogram. The luminance gradient histogram updating unit 42 supplies the generated luminance gradient histogram to the representative direction calculation unit 43 or the luminance gradient histogram selection unit 24.

The representative direction calculation unit 43 calculates the direction of a representative luminance gradient vector from among the pixels in the local area that includes the feature point position on the basis of the luminance gradient histogram supplied from the luminance gradient histogram updating unit 42 as a representative direction, and then supplies the representative direction to the image rotation unit 44. The image rotation unit 44 rotates the input image on the basis of the input image and feature point positions supplied from the feature point detection unit 21 and the representative direction supplied from the representative direction calculation unit 43, and then supplies the rotated input image to the luminance gradient vector calculation unit 41 and the luminance gradient histogram generation unit 23.

Note that, hereinafter, the input image rotated by the image rotation unit 44 is also termed a rotated input image. In addition, not the luminance gradient histogram generated on the basis of the input image supplied from the feature point detection unit 21 but a luminance gradient histogram generated from the rotated input image is supplied from the luminance gradient histogram updating unit 42 to the luminance gradient histogram selection unit 24.

The luminance gradient histogram generation unit 23 generates a luminance gradient histogram of a local area that includes a position close to a feature point in the rotated input image for each feature point position on the basis of the rotated input image supplied from the image rotation unit 44. The luminance gradient histogram generation unit 23 includes a close position selection unit 45, a luminance gradient vector calculation unit 46 and a luminance gradient histogram updating unit 47.

The close position selection unit 45 selects some positions close to each feature point of the rotated input image supplied from the image rotation unit 44, and then supplies the selected close positions and the rotated input image to the luminance gradient vector calculation unit 46. For example, four close positions close to each feature point are selected.

The luminance gradient vector calculation unit 46 uses the close positions of each feature point, supplied from the close position selection unit 45, and the rotated input image to calculate a luminance gradient vector of each pixel in a local area that includes each close position, and then supplies the luminance gradient vectors to the luminance gradient histogram updating unit 47.

The luminance gradient histogram updating unit 47 uses the luminance gradient vectors supplied from the luminance gradient vector calculation unit 46 to update the luminance gradient histogram being held, and then generates an ultimate luminance gradient histogram. In the luminance gradient histogram updating unit 47, a luminance gradient histogram is generated for each local area that includes each close position, and is supplied from the luminance gradient histogram updating unit 47 to the luminance gradient histogram selection unit 24.

The luminance gradient histogram selection unit 24 compares the luminance gradient histograms supplied from the luminance gradient histogram updating unit 42 with the luminance gradient histograms supplied from the luminance gradient histogram updating unit 47. That is, the luminance gradient histogram selection unit 24 selects the luminance gradient histogram, of which the distribution of luminance gradient vectors is most different from the luminance gradient histogram of the feature point, from among the luminance gradient histograms of a plurality of close positions located close to one feature point. Then, the luminance gradient histogram selection unit 24 supplies the luminance gradient histogram of each feature point and the luminance gradient histogram of one close position selected in correspondence with that feature point to the feature descriptor generation unit 25.

The feature descriptor generation unit 25 uses the luminance gradient histogram of each feature point, supplied from the luminance gradient histogram selection unit 24, and the luminance gradient histogram of each close position located close to corresponding feature point to generate a feature descriptor at each feature point and then outputs the feature descriptors.

The feature descriptors detected from the input image in this manner are used, for example, for image recognition in which the same subject is detected from a plurality of images. The image recognition is used for a stereo vision technique in which, for example, in a group of images having a parallax, areas that show the same subject are recognized and depth information is calculated on the basis of the obtained information. In addition, the image recognition is also used, for example, for a technique for detecting a prephotographed object, such as a person and a traffic sign, from a predetermined image or a tracking technique for continuously tracking a specific object in a moving image.

Incidentally, as the image processing apparatus 11 receives the input image and is instructed to detect feature descriptors from the input image, the image processing apparatus 11 starts a feature descriptor generating process, which is a process of detecting (extracting) feature descriptors from the input image. Hereinafter, the feature descriptor generating process executed by the image processing apparatus 11 will be described with reference to the flowchart shown in FIG. 2.

In step S11, the feature point detection unit 21 detects positions of feature points from the supplied input image, and supplies the feature point positions, which are positions of the detected feature points, and the input image to the luminance gradient vector calculation unit 41 and the image rotation unit 44. For example, the feature point detection unit 21 detects feature points from the input image by a detecting method called "Harris corner detector".

In step S12, the luminance gradient vector calculation unit 41 selects one of the plurality of the feature points on the input image supplied from the feature point detection unit 21.

In step S13, the luminance gradient histogram generation unit 22 carries out a process of generating a luminance gradient histogram at the feature point position, and generates a luminance gradient histogram of a local area that includes the feature point selected in the process of step S12.

Figure 3:
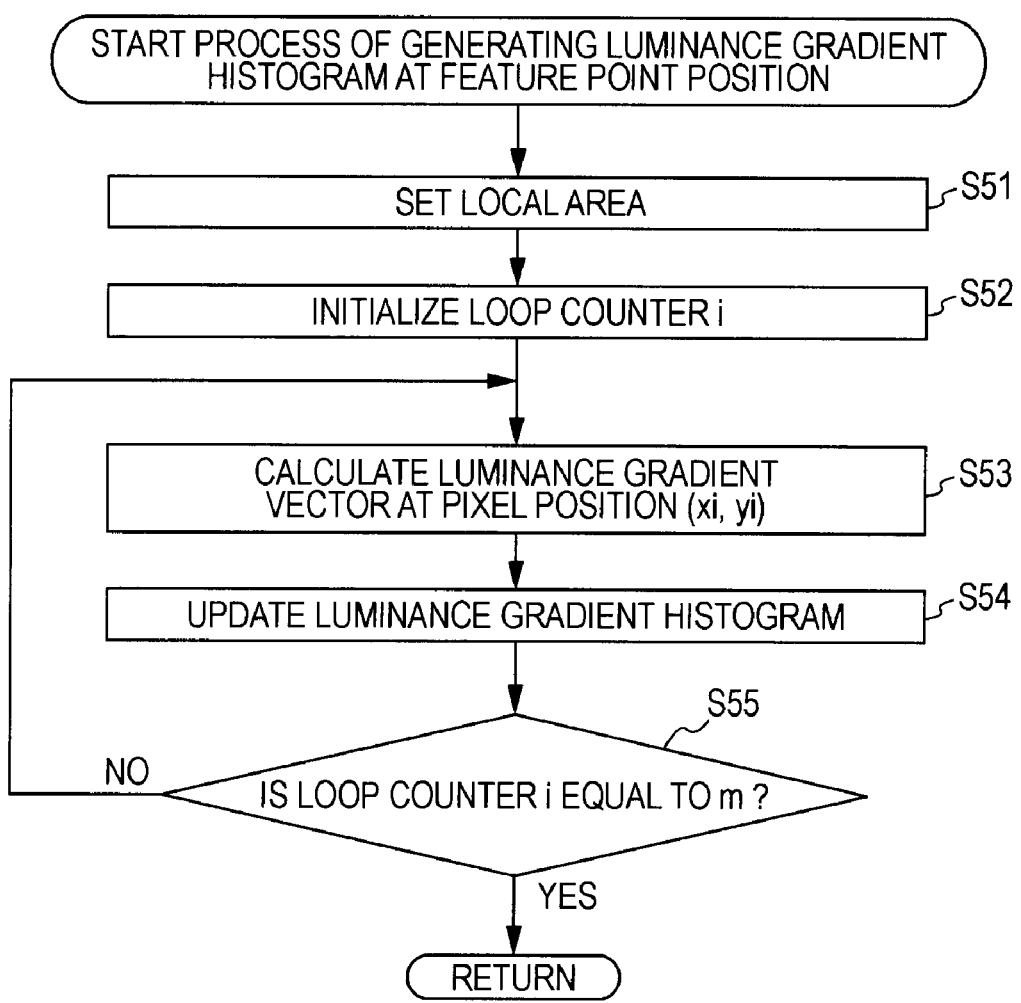
FIG. 3 is a flowchart that illustrates a process of generating a luminance gradient histogram at each feature point position.

Here, the process of generating a luminance gradient histogram at the feature point position, which corresponds to the process of step S13, will be described with reference to the flowchart shown in FIG. 3.

In step S51, the luminance gradient vector calculation unit 41 sets a local area for a focusing feature point, that is, the feature point selected in the process of step S12 (hereinafter, also referred to as a focused feature point). Specifically, the luminance gradient vector calculation unit 41 sets the local area of the focused feature point to an area included within a circle that has the focused feature point as a center and has a radius of r pixels on the input image.

Hereinafter, the number of pixels included in the local area is m (where m is natural number), the position of a pixel $G_i$ (where $1 \leq i \leq m$) is expressed by a pixel position $(x_i, y_i)$. Here, "$x_i$" and "$y_i$" in the pixel position $(x_i, y_i)$ respectively indicate x-coordinate and y-coordinate of the pixel position of the pixel $G_i$ in xy coordinate system in which predetermined mutually orthogonal directions are set to an x direction and a y direction on the input image.

In addition, more specifically, the luminance gradient vector calculation unit 41 clips an area having a predetermined size with the focused feature point as a center from the overall area of the input image and then uses the clipped area of the input image to carry out a process of generating a luminance gradient histogram.

In step S52, the luminance gradient vector calculation unit 41 initializes a loop counter i for specifying the processing target pixel $G_i$ in the local area to set i at 1.

In step S53, the luminance gradient vector calculation unit 41 calculates the luminance gradient vector of the pixel $G_i$ at the pixel position $(x_i, y_i)$ and then supplies the calculated luminance gradient vector to the luminance gradient histogram updating unit 42. Specifically, the luminance gradient vector calculation unit 41 calculates the following mathematical expressions (1) and (2) to obtain a first derivative $Ix(x_i, y_i)$ in the x direction of the pixel value of the pixel $G_i$ and a first derivative $Iy(x_i, y_i)$ in the y direction of the pixel value of the pixel $G_i$.

$$Ix(x_i,y_i)=I(x_i+1,y_i)-I(x_i-1,y_i) \quad (1)$$

$$Iy(x_i,y_i)=I(x_i,y_i+1)-I(x_i,y_i-1) \quad (2)$$

Note that in the mathematical expressions (1) and (2), I(x, y) indicates the pixel value of a pixel of which the pixel position is (x, y). Thus, a difference between the pixel value of a pixel adjacent to the pixel $G_i$ in the x direction and the pixel value of a pixel adjacent to the pixel $G_i$ in the direction opposite to the x direction is a first derivative $Ix(x_i, y_i)$ of the pixel $G_i$ in the x direction. Similarly, a difference between the pixel value of a pixel adjacent to the pixel $G_i$ in the y direction and the pixel value of a pixel adjacent to the pixel $G_i$ in the direction opposite to the y direction is a first derivative $Iy(x_i, y_i)$ of the pixel $G_i$ in the y direction.

The first derivative $Ix(x_i, y_i)$ and the first derivative $Iy(x_i, y_i)$ each indicate a gradient of luminance in a predetermined direction at the pixel $G_i$, that is, a variation in pixel value. The luminance gradient vector calculation unit 41 sets a vector formed of the thus obtained first derivative $Ix(x_i, y_i)$ and first derivative $Iy(x_i, y_i)$ as a luminance gradient vector of the pixel $G_i$. Note that the magnitude $n(x_i, y_i)$ and direction $\theta(x_i, y_i)$ of the luminance gradient vector are expressed by the following mathematical expressions (3) and (4).

$$n(x_i,y_i)=((Ix(x_i,y_i))^2+(Iy(x_i,y_i))^2)^{1/2} \quad (3)$$

$$\theta(x_i,y_i)=\tan^{-1}(Iy(x_i,y_i)/Ix(x_i,y_i)) \quad (4)$$

In step S54, the luminance gradient histogram updating unit 42 updates the held luminance gradient histogram of the local area on the basis of the luminance gradient vector supplied from the luminance gradient vector calculation unit 41.

Specifically, the luminance gradient histogram updating unit 42 holds the luminance gradient histogram of the processing target local area. The luminance gradient histogram is a histogram in which the ordinate axis represents frequency (frequency at which a luminance gradient vector appears) and the abscissa axis represents an angle of the luminance gradient vector at a pixel. The bin of the histogram is determined on the basis of the direction of the luminance gradient vector, and the magnitude of the luminance gradient vector is used as the frequency added to the bin.

Here, the bin means a one divided direction range when a range of possible values of the direction of luminance gradient vector, indicated by the abscissa axis of the luminance gradient histogram, is divided into some numbers. For example, the range of the abscissa axis of the luminance gradient histogram (0, 2π), that is, a range from 0 to 2π (where 2π is not inclusive). If the number of bins is P, the bin is determined by the following mathematical expression (5) with respect to the direction $\theta(x_i, y_i)$ of the luminance gradient vector.

[Expression 1]

$$bin(x_i,y_i)=\lfloor \theta(x_i,y_i)/(2\pi/P) \rfloor \quad (5)$$

That is, the maximum integer that does not exceed a number obtained by dividing the direction $\theta(x_i, y_i)$ of the luminance gradient vector by (2π/P) is set as a bin of the luminance gradient vector of which the direction is $\theta(x_i, y_i)$. In this way, any one of the P bins is determined for each luminance gradient vector. The luminance gradient histogram updating unit 42 adds the magnitude $n(x_i, y_i)$ of the luminance gradient vector to the frequency of the bin determined by the direction of the luminance gradient vector supplied from the luminance gradient vector calculation unit 41 among the bins of the held luminance gradient histogram of the local area to update the held luminance gradient histogram.

That is, the luminance gradient histogram updating unit 42 holds vectors formed of frequencies of P bins as a luminance gradient histogram, and adds the magnitude of the luminance gradient vector to the frequency of the bin corresponding to the luminance gradient vector each time the luminance gradient vector is supplied from the luminance gradient vector calculation unit 41.

When the luminance gradient histogram is updated, not the frequency at which the luminance gradient vectors appear but the magnitude of each luminance gradient vector is added to the frequency of each bin. Thus, the weights are assigned to the frequency of the luminance gradient histogram in accordance with the magnitude of the luminance gradient vector. Assignment of the weights is performed because a pixel having a large luminance gradient vector more represents the feature of the input image than a pixel having a small luminance gradient vector.

In this way, as the luminance gradient histogram of the processing target local area is updated, the luminance gradient vector calculation unit 41 determines in step S55 whether the value of the loop counter i is m.

In step S55, when it is determined that the value of the loop counter i is not m, not all the m pixels in the local area are set as a processing target. Thus, the luminance gradient vector calculation unit 41 increments the value of the loop counter i. After that, the process returns to step S53, and the next pixel in the local area is selected, and then the luminance gradient vector of that pixel is calculated.

In contrast, when it is determined in step S55 that the value of the loop counter i is m, all the pixels in the local area have been set as a processing target. Thus, the luminance gradient histogram updating unit 42 supplies the held luminance gradient histogram to the representative direction calculation unit 43 as the luminance gradient histogram of the local area.

Figure 2:
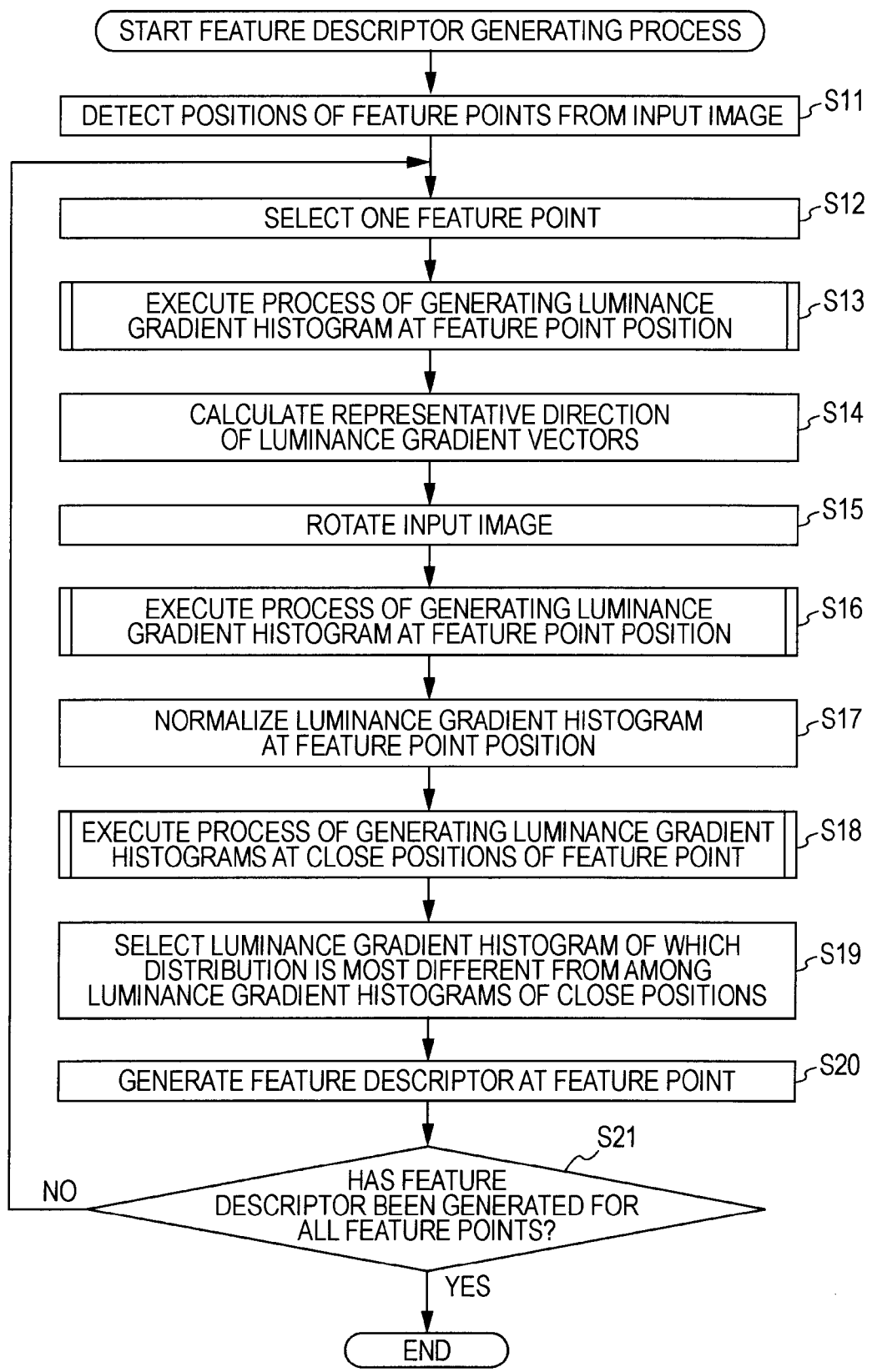
FIG. 2 is a flowchart that illustrates a process of generating feature descriptors.

In this way, as the luminance gradient histogram of the local area that includes one feature point is generated, the process of generating the luminance gradient histogram at the feature point position ends and, after that, the process proceeds to step S14 of FIG. 2.

Referring back to the flowchart shown in FIG. 2, in step S14, the representative direction calculation unit 43 uses the luminance gradient histogram supplied from the luminance gradient histogram updating unit 42 to calculate the representative direction of the luminance gradient vectors in the processing target local area.

For example, the representative direction calculation unit 43 selects the bin having a maximum frequency from among the bins of the supplied luminance gradient histogram, and then sets the median value of the range in the direction of the luminance gradient vector indicated by the selected bin as a representative direction θ0 of the local area that includes the feature point. Then, the representative direction calculation unit 43 supplies the calculated representative direction θ0 to the image rotation unit 44.

In step S15, the image rotation unit 44 rotates the input image on the basis of the input image and feature point positions, supplied from the feature point detection unit 21, and the representative direction, supplied from the representative direction calculation unit 43.

Specifically, the image rotation unit 44 clips an area having a predetermined size with the focused feature point as a center from the overall area of the input image and then rotates the clipped area in the direction opposite to the representative direction θ0 of the local area about the focused feature point by the angle of the representative direction θ0. Then, the image rotation unit 44 sets the input image obtained through rotation as the rotated input image and then supplies the rotated input image to the luminance gradient vector calculation unit 41 and the close position selection unit 45.

Here, the direction of the luminance gradient vector of each pixel indicates a rotation angle with respect to a predetermined reference direction (hereinafter, also referred to as reference direction) in the input image, that is, an angle made between the reference direction and the luminance gradient vector. In addition, the representative direction θ0 may be regarded as a most frequent direction among the directions of the luminance gradient vectors of the pixels in the local area.

For example, when a subject on the input image is rotated, the representative direction θ0 of the local area that includes the feature point on the subject also varies in the rotation direction of the subject by the same angle as the rotation angle. Therefore, as the input image is rotated about the feature point by the angle indicated by the representative direction θ0 to obtain the rotated input image, the representative direction θ0 at the feature point of the rotated input image is constantly a reference direction. Thus, as the luminance gradient histogram of the local area that includes the feature point is calculated from the rotated input image again, it is possible to obtain the luminance gradient histogram that is invariable against the rotation of the subject.

Note that, when the input image is rotated, xy coordinate system is not rotated. In addition, even when the subject on the input image is translated on the input image, the luminance gradient vector remains unchanged. Thus, the luminance gradient histogram is invariable against the translation of the subject. Furthermore, the local area is a circular area having a radius of r pixels, and the rotation center of the input image is the feature point. Thus, the local area is invariable against the rotation of the input image.

The image rotation unit 44 rotates the input image on the basis of the representative direction θ0, and generates a luminance gradient histogram from the obtained rotated input image.

Note that when the luminance gradient histogram at the close position close to the feature point is generated, the representative direction in the local area of the feature point is used as the representative direction in the local area of the close position. That is, in generating the luminance gradient histogram of the close position, the rotated input image obtained by rotating the input image on the basis of the representative direction is used.

In step S16, the luminance gradient histogram generation unit 22 carries out the process of generating a luminance gradient histogram at the feature point position using the rotated input image as a processing target to generate the luminance gradient histogram. Note that the process of generating a luminance gradient histogram at the feature point position is a similar process to the process described with reference to FIG. 3, so the description thereof is omitted.

However, the rotated input image is set as the processing target image. That is, the luminance gradient vector calculation unit 41 uses the rotated input image from the image rotation unit 44 to calculate luminance gradient vectors. The luminance gradient histogram updating unit 42 distributes the magnitudes of the luminance gradient vectors to respective bins of the luminance gradient histogram using the magnitudes of the luminance gradient vectors obtained from the rotated input image as frequencies and using the directions of the luminance gradient vectors as angles. By so doing, the luminance gradient histogram that indicates a distribution of luminance gradient vectors in the local area is obtained.

In step S17, the luminance gradient histogram updating unit 42 normalizes the luminance gradient histogram generated in the process of step S16, and then supplies the normalized luminance gradient histogram to the luminance gradient histogram selection unit 24. Specifically, the luminance gradient histogram updating unit 42 normalizes the luminance gradient histogram so that the total of frequencies of the respective bins that constitute the luminance gradient histogram is 1.

For example, where the luminance gradient histogram is formed of P bins, that is, a bin B1 to a bin BP (where P is natural number), and the frequency of the bin Bp (where $1 \leq p \leq P$) is H(p), the frequency H'(p) of the normalized bin Bp is expressed by the following mathematical expression (6).

[Expression 2]

$$H'(p) = \frac{H(p)}{\sum_{j=1}^{P}(j)} \qquad (6)$$

That is, a value obtained by dividing the frequency H(p) of the bin Bp by the total of frequencies H(1) to H(P) of the bins is set as the frequency H'(p) of the normalized bin Bp. In this way, by normalizing the luminance gradient histogram, it is possible to make the luminance gradient histogram invariable against the intensity of illumination irradiated to the subject on the input image. This is because the magnitude of each luminance gradient vector varies with a variation in intensity of illumination irradiated to the subject, so the frequency of each bin, when normalized, indicates the magnitude relative to the frequencies of the other bins and becomes invariable against a variation in intensity of illumination.

In step S18, the luminance gradient histogram generation unit 23 uses the rotated input image supplied from the image rotation unit 44 to carry out the process of generating a luminance gradient histogram at the close position to the feature point, and then generates the luminance gradient histogram of the close position.

Here, the process of generating a luminance gradient histogram at the close position to the feature point, which corresponds to the process in step S18, will be described with reference to the flowchart shown in FIG. 4.

In step S81, the close position selection unit 45 selects one of the plurality of close positions located close to the focused feature point on the rotated input image on the basis of the rotated input image supplied from the image rotation unit 44, and supplies the selected result and the rotated input image to the luminance gradient vector calculation unit 46.

Figure 5:
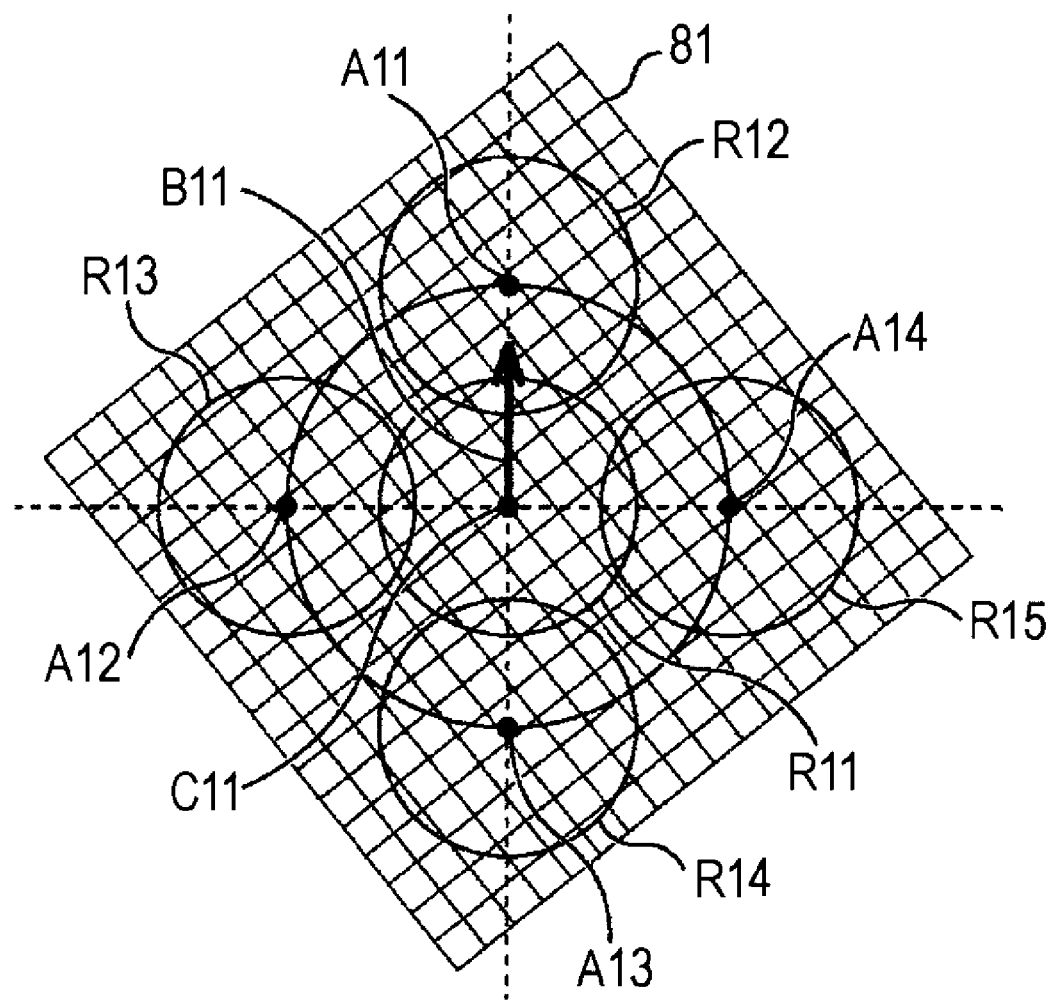
FIG. 5 is a view that illustrates close positions to each feature point.

For example, as shown in FIG. 5, the close position selection unit 45 selects one of the four close positions A11 to A14 close to the feature point position C11 located at the center of the rotated input image 81. In FIG. 5, an arrow B11 that has a start point at a pixel (feature point) of the feature point position C11 indicates the representative direction of the luminance gradient vector of the feature point, and a circular area R11 having a center at the feature point position C11 indicates a local area of the feature point.

In addition, the respective close positions A11 to A14 are positions of the pixels on the same circumference having a center at the feature point position C11, and are located to equally divide the circumference. That is, the respective close positions A11 to A14 are located at an equal distance from the feature point position C11.

In the example of FIG. 5, the close positions A11 to A14 are located on the upper, lower, left and right sides of the feature point position C11 in the drawing, and those close positions equally divide the circumference of the circle having a center at the feature point position C11 into four. Then, the respective circular areas R12 to R15 having a radius of r pixels and respectively having centers at the close positions A11 to A14 are local areas of the close positions A11 to A14. Note that the respective areas R11 to R15 that are the local area of the feature point position C11 and the local areas of the close positions A11 to A14 have the same size (area).

In the rotated input image, some of the pixel positions are used as the close positions, and the luminance gradient histograms of these close positions are generated. Then, the feature descriptor at the feature point is generated on the basis of the luminance gradient histogram, of which the distribution is most different from that of the luminance gradient histogram of the feature point from among the luminance gradient histograms of these close positions, and the luminance gradient histogram of the feature point.

Here, to generate the luminance gradient histograms of the local areas close to the feature point, a plurality of pixels are located close to the feature point and it is wasteful to generate luminance gradient histograms at all those pixel positions. This is because as the close position of the feature point is too close to the feature point, the luminance gradient histograms of these two points are substantially the same, so the luminance gradient histogram of the pixel position that is too close to the feature point is inappropriate for generating a feature descriptor.

Then, it is determined that a distance sufficiently away from the feature point is r pixels, and positions of pixels on the circumference of a circle having a radius of r pixels and having the feature point as a center are set as close positions. Thus, it is possible to set close positions appropriate for obtaining a feature descriptor. In addition, the reason why the close positions are located to equally divide the circumference of the circle having the feature point as a center is because it is wasteful to obtain luminance gradient histograms of all the pixel positions on the circumference, and the close positions should be selected at appropriate intervals.

In this way, as the rotated input image 81 shown in FIG. 5 is, for example, supplied from the image rotation unit 44, the close position selection unit 45 selects one of the close positions A11 to A14.

Figure 4:
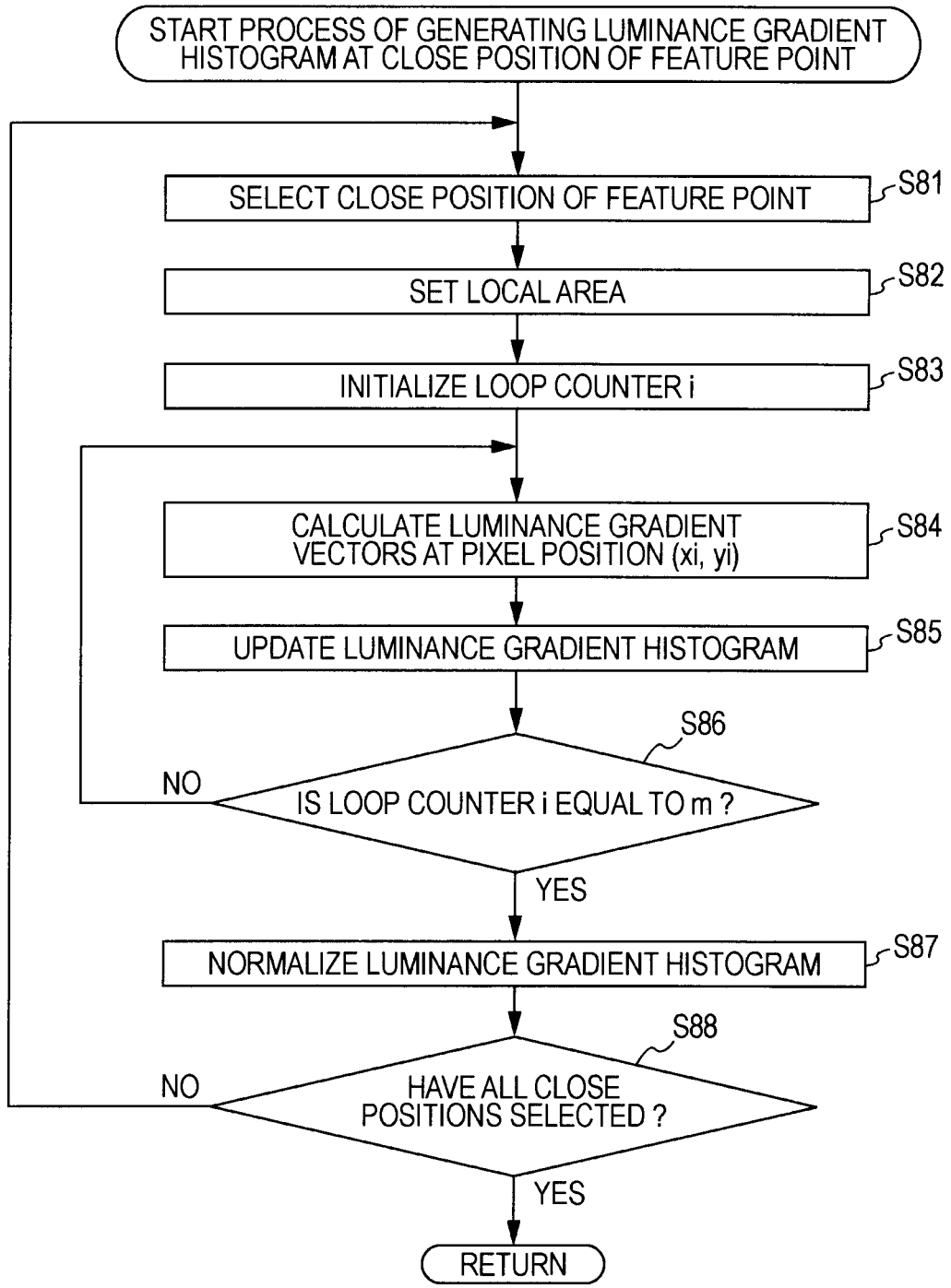
FIG. 4 is a flowchart that illustrates a process of generating a luminance gradient histogram at a close position to each feature point.

Referring back to the flowchart shown in FIG. 4, in step S82, the luminance gradient vector calculation unit 46 uses the selected result from the close position selection unit 45 and the rotated input image to set the local area of the selected close position. By so doing, for example, the local area R12 is set for the selected close position A11 shown in FIG. 5.

As the local area of the close position is set, the processes in steps S83 to S86 are executed thereafter. These processes are similar to those of the processes in steps S52 to S55 shown in FIG. 3, so the description thereof is omitted.

That is, for each of the pixels in the local area of the set close position, the luminance gradient vector calculation unit 46 calculates the above described mathematical expressions (1) and (2) to obtain a luminance gradient vector. Then, the luminance gradient histogram updating unit 47 updates the luminance gradient histogram on the basis of the luminance gradient vectors of the pixels in the local area to generate the luminance gradient histogram of the selected close position.

In step S86, when it is determined that the value of the loop counter i is m, that is, when the luminance gradient histogram is updated by the luminance gradient vectors of all the pixels in the local area of the selected close position, the process proceeds to step S87.

In step S87, the luminance gradient histogram updating unit 47 normalizes the luminance gradient histogram obtained through the processes in steps S81 to S86, and then supplies the normalized luminance gradient histogram to the luminance gradient histogram selection unit 24.

Specifically, the luminance gradient histogram updating unit 47 calculates the above described mathematical expression (6) to normalize the luminance gradient histogram so that the total of frequencies of bins that constitute the luminance gradient histogram is 1. Note that, in this case, in the mathematical expression (6), the frequency of a bin of the luminance gradient histogram of the close position is H(p). Through the normalization, the luminance gradient histogram of the selected close position becomes an invariable value against a variation in intensity of illumination.

In step S88, the close position selection unit 45 determines whether all the close positions close to the focused feature point have been selected. For example, when all the close positions A11 to A14 shown in FIG. 5 have been selected and the luminance gradient histograms of those close positions are obtained, it is determined that all the close positions have been selected.

In step S88, when it is determined that all the close positions have not been selected yet, the process returns to step S81, and the above described processes are repeated. That is, a new close position is selected, and the luminance gradient histogram of that close position is obtained.

In contrast, in step S88, when it is determined that all the close positions have been selected, the process of generating a luminance gradient histogram in each of the close positions to the feature point ends, and then the process proceeds to step S19 shown in FIG. 2. As the process of generating a luminance gradient histogram in each of the close positions to the feature point has been completed, the respective luminance gradient histograms of the plurality of close positions close to the focused feature point are supplied from the luminance gradient histogram updating unit 47 to the luminance gradient histogram selection unit 24.

Referring back to the flowchart shown in FIG. 2, in step S19, the luminance gradient histogram selection unit 24 selects the luminance gradient histogram of which the distribution is most different from the luminance gradient histogram of the feature point, supplied from the luminance gradient histogram updating unit 42, from among the luminance gradient histograms of the plurality of close positions supplied from the luminance gradient histogram updating unit 47.

For example, it is assumed that the respective luminance gradient histograms of the K close positions $A_1$ to $A_K$ close to the feature point are obtained. In addition, each luminance gradient histogram is formed of P bins, the frequency of each bin of the luminance gradient histogram of the feature point is Hc(j) (where $1 \leq j \leq P$), and the frequency of each bin of the luminance gradient histogram of each close position $A_k$ (where $1 \leq k \leq K$) is Hk(j) (where $1 \leq j \leq P$).

In this case, the luminance gradient histogram selection unit 24 calculates the following mathematical expression (7) to obtain a similarity Sk between the luminance gradient histogram of the feature point and the luminance gradient histogram of each close position $A_k$.

[Expression 3]

$$Sk = \sum_{j=1}^{p} (Hc(j) - Hk(j))^2 \qquad (7)$$

That is, the sum of squares of a difference between the frequency Hc(j) of each bin of the luminance gradient histogram of the feature point and the frequency Hk(j) of the corresponding bin of the luminance gradient histogram of the close position is a similarity Sk.

As the value of the similarity Sk increases, the distribution of luminance gradient vectors is more different between the luminance gradient histogram of the feature point and the luminance gradient histogram of the close position. That is, the similarity Sk indicates the degree of similarity of the luminance gradient histogram of the close position with respect to the luminance gradient histogram of the feature point. As the value of the similarity Sk increases, the degree of similarity with respect to the luminance gradient histogram of the feature point decreases.

The luminance gradient histogram selection unit 24 selects the maximum similarity Sk from among the luminance gradient histograms of the K close positions as the luminance gradient histogram of which the distribution of the luminance gradient vectors is most different from the luminance gradient histogram of the feature point. Then, the luminance gradient histogram selection unit 24 supplies the luminance gradient histogram of the selected close position and the luminance gradient histogram of the feature point to the feature descriptor generation unit 25.

In step S20, the feature descriptor generation unit 25 uses the luminance gradient histogram of the feature point and the luminance gradient histogram of the close position, which are supplied from the luminance gradient histogram selection unit 24, to generate a feature descriptor at the feature point, and then outputs the feature descriptor.

The frequencies of the bins may be regarded as components of vectors of the luminance gradient histogram, and the luminance gradient histogram may be expressed in vector by arranging those plurality of frequencies. Then, the feature descriptor generation unit 25 connects two vectors obtained from the luminance gradient histogram of the feature point and the luminance gradient histogram of the close position, and the resultant one vector is a feature descriptor at the feature point.

The thus generated feature descriptor of the feature point is generated from the luminance gradient histogram of the feature point and the luminance gradient histogram of the close position, so the feature descriptor is robust against rotation of the subject, that is, a change of viewpoint and a variation in intensity of illumination to the subject.

In addition, the generated feature descriptor is used in, for example, image recognition process that detects the same subject from a plurality of images in the following step. For example, detection of a subject is carried out by comparing the feature descriptors at the respective feature points on the different images. The comparison of the feature descriptors calculates a similarity by a Euclidean distance between vectors as the feature descriptors, and evaluates on the basis of the similarity whether both feature points are similar to each other. Then, when it is determined that both feature points are similar to each other, it is recognized that those feature points are the same portion of the same subject.

As the feature descriptor of one feature point is generated and output, the process proceeds from step S20 to step S21.

In step S21, the image processing apparatus 11 determines whether a feature descriptor is generated for each of the feature points detected from the input image. In step S21, when it is determined that the feature descriptors of all the feature points have not been generated yet, the process returns to step S12, and then the above described processes are repeated. That is, a new feature point on the input image is selected, and a feature descriptor at the selected feature point is generated.

On the other hand, in step S21, when it is determined that a feature descriptor has been generated for each of the feature points, the process of generating a feature descriptor ends.

In the above described manner, the image processing apparatus 11 detects feature points from the input image, and generates a luminance gradient histogram of each feature point and luminance gradient histograms of a plurality of close positions close to each feature point. Then, the image processing apparatus 11 selects a luminance gradient histogram of which the distribution of luminance gradient vectors is most different from the luminance gradient histogram of the feature point from among the generated luminance gradient histograms of the plurality of close positions, and then generates a feature descriptor of the feature point on the basis of the selected luminance gradient histogram and the luminance gradient histogram of the feature point.

In this way, the luminance gradient histogram of the feature point is connected to the luminance gradient histogram of the close position, of which the distribution of the luminance gradient vectors is most different, to generate a feature descriptor. Thus, it is possible to detect, from an image, an easily usable feature descriptor, which is robust against a change in viewpoint and illumination and of which calculation cost necessary for detection is low.

That is, the luminance gradient histogram of the feature point and the luminance gradient histogram of the close position of which the distribution of the luminance gradient vectors is most different are used to generate a feature descriptor. Thus, in comparison with the case where only the luminance gradient histogram at the feature point is simply used as a feature descriptor, it is possible to improve the performance of the feature descriptor.

Specifically, when the distribution of luminance gradient vectors in the local area is expressed by histogram, spatial information of the luminance gradient vectors is lost. That is, when a plurality of luminance gradient vectors are given, even when the luminance gradient vectors are distributed to the bins of the luminance gradient histogram in any order, the resultant luminance gradient histogram is the same. Conversely, even in the same luminance gradient histogram, the spatial distribution of luminance gradient vectors in the local area from which the luminance gradient histogram is obtained can be various.

Thus, when only the luminance gradient histogram of the feature point is used as a feature descriptor, it is highly likely to erroneously recognize different subjects as the same subject. Then, as one method for decreasing the possibility of erroneous recognition, it is conceivable that a luminance gradient histogram is calculated at a plurality of pixel positions close to a feature point, and the luminance gradient histograms are arranged in the same sequence as the spatial arrangement sequence of the pixel positions to improve the performance of the feature descriptor.

The above method is used in a method of detecting a feature descriptor called "SIFT descriptor"; however, the number of dimensions of the feature descriptor problematically increases. A detecting method called "PCA-SIFT" shows that principal component analysis is effective for reducing the number of dimensions of the feature descriptor. That is, it appears that, only by simply arranging a plurality of luminance gradient histograms, it is redundant as a descriptive method for a feature descriptor.

Then, in the image processing apparatus 11, one of luminance gradient histograms obtained at a plurality of pixel positions (close positions) close to a feature point is selected and is connected to a luminance gradient histogram at the feature point to generate a feature descriptor in which redundancy is reduced.

Here, the luminance gradient histogram at the feature point is Hc, the luminance gradient histogram of the close position selected from among the plurality of close positions is Hn, and the ultimately generated feature descriptor is (Hc, Hn).

In the image processing apparatus 11, close positions are selected from positions close to the feature point, so many luminance gradient histograms obtained from those close positions are expectedly similar to the luminance gradient histogram Hc of the feature point.

When the feature descriptor (Hc, Hn) is generated, even when the feature descriptor is generated by combining the luminance gradient histogram Hc with the luminance gradient histogram of the close position similar to the luminance gradient histogram Hc, the amount of information hardly increases. Thus, it is reasonable that a luminance gradient histogram that is most dissimilar to the luminance gradient histogram Hc is selected as the luminance gradient histogram Hn.

A luminance gradient histogram is normalized and may be expressed by an N-dimensional vector (where N is natural number), so geometrically, the luminance gradient histogram Hc is one point on the hypersphere of an N-dimensional space, and the luminance gradient histogram Hn is also one point on the hypersphere of an N-dimensional space similarly.

If a luminance gradient histogram similar to the luminance gradient histogram Hc is selected as the luminance gradient histogram Hn, two points on the hypersphere that indicate these luminance gradient histograms are located close to each other on the hypersphere. Conversely, if a luminance gradient histogram that is dissimilar to the luminance gradient histogram Hc is selected as the luminance gradient histogram Hn, two points on the hypersphere that indicate these luminance gradient histograms are located away from each other on the hypersphere.

Here, two feature descriptor (Hc0, Hn0) and feature descriptor (Hc1, Hn1) detected from mutually different images are given. In this case, when a luminance gradient histogram that is similar to the luminance gradient histogram Hc is selected as the luminance gradient histogram Hn, even when, for example, two feature descriptors are obtained from different subjects, four points Hc0, Hn0, Hc1 and Hn1 concentrate on one location on the hypersphere. In this case, even when two feature descriptors are compared, it is difficult to determine whether the feature points obtained from those feature descriptors are detected from the same subject.

In contrast, a luminance gradient histogram that is dissimilar to the luminance gradient histogram Hc is selected as the luminance gradient histogram Hn. In this case, when two feature descriptors are obtained from different subjects, even when Hc0 and Hc1 are located at positions close to each other on the hypersphere, Hn0 and Hn1 are expectedly present at locations away from Hc0 and Hc1. Thus, it is possible to easily determine whether the feature points obtained from those feature descriptors are detected from the same subject.

Thus, in the image processing apparatus 11, by combining the luminance gradient histogram of the feature point with the luminance gradient histogram of the close position of which the distribution of luminance gradient vectors are most different from the luminance gradient histogram of the feature point, it is possible to provide a feature descriptor that may be easily utilized in further reduced number of dimensions and that is able to further reliably detect a subject. In addition, it is possible to obtain a feature descriptor by a simple process that only obtains a luminance gradient histogram at a feature point and luminance gradient histograms at some pixel positions close to the feature point, that is, at a low calculation cost.

The feature descriptor obtained by the image processing apparatus 11 may be obtained through a simple process, and stable recognition result may be easily obtained when carrying out image recognition using the obtained feature descriptor. Thus, the above feature descriptor is particularly suitable for usage in a mobile device.

The above described series of processes may be implemented by hardware or may be implemented by software. When the series of processes are executed by software, a program that constitutes the software is installed onto a computer that is assembled to exclusive hardware or is installed from a program recording medium onto, for example, a general-purpose personal computer that is able to execute various functions by installing various programs.

FIG. 6 is a block diagram that shows a configuration example of hardware of a computer that executes the above described series of processes on the basis of a program.

In the computer, a CPU (Central Processing Unit) 201, a ROM (Read Only Memory) 202 and a RAM (Random Access Memory) 203 are connected to one another by a bus 204.

An input/output interface 205 is further connected to the bus 204. An input unit 206, an output unit 207, a recording unit 208, a communication unit 209 and a drive 210 are connected to the input/output interface 205. The input unit 206 is formed of a keyboard, a mouse, a microphone, or the like. The output unit 207 is formed of a display, a speaker, or the like. The recording unit 208 is formed of a hard disk, a nonvolatile memory, or the like. The communication unit 209 is formed of a network interface, or the like. The drive 210 drives a removable medium 211, such as a magnetic disk, an optical disk, a magneto-optical disk, a semiconductor memory, or the like.

In the thus configured computer, when the CPU 201, for example, loads the program recorded in the recording unit 208 onto the RAM 203 through the input/output interface 205 and the bus 204 and executes the program to carry out the above described series of processes.

A program executed by the computer (CPU 201) is provided, for example, by being recorded in the removable medium 211, which is a packaged medium formed of a magnetic disk (including a flexible disk), an optical disk (CD-ROM (Compact Disc-Read Only Memory), DVD (Digital Versatile Disc), or the like), a magneto-optical disk, a semiconductor memory, or the like, or through a wired or wireless transmission medium, such as a local area network, the Internet and a digital satellite broadcast.

Then, the program may be installed onto the recording unit 208 through the input/output interface 205 by loading the removable medium 211 into the drive 210. In addition, the program may be received by the communication unit 209 and installed onto the recording unit 208 through the wired or wireless transmission medium. Other than the above, the program may be pre-installed onto the ROM 202 or the recording unit 208.

Note that the program executed by a computer may execute processes in time sequence in the order described in the specification or may execute processes in parallel or at a selected timing at which the program is called.

Note that, the embodiment of the invention is not limited to the above described embodiment and may be modified into various forms without departing from the scope of the invention.

The present application contains subject matter related to that disclosed in Japanese Priority Patent Application JP 2008-216986 filed in the Japan Patent Office on Aug. 26, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
first distribution calculation means that calculates a distribution of luminance gradient vectors in a first local area that includes a feature point on an image;
second distribution calculation means that calculates distributions of the luminance gradient vectors in second local areas close to the feature point on the image;
selection means that compares the distribution of the luminance gradient vectors of the first local area with the distributions of the luminance gradient vectors of the second local areas to select the distribution of the luminance gradient vectors of the second local area of which the distribution is most different from the distribution of the luminance gradient vectors of the first local area from among the distributions of the luminance gradient vectors of the plurality of second local areas; and
feature descriptor calculation means that calculates a feature descriptor at the feature point on the basis of the distribution of the luminance gradient vectors of the first local area and the distribution of the luminance gradient vectors of the second local area selected by the selection means.

2. The image processing apparatus according to claim 1, wherein respective center positions of the plurality of second local areas are located on a circumference of a circle of which a center is the feature point.

3. The image processing apparatus according to claim 2, wherein a plurality of the respective center positions equally divides the circumference.

4. The image processing apparatus according to claim 1, wherein
a luminance gradient histogram is calculated as a distribution of the luminance gradient vectors to indicate a frequency, which is calculated for each direction of the luminance gradient vector and at which the luminance gradient vector having that direction appears, and
the selection means calculates a similarity of the luminance gradient histogram of each second local area with respect to the luminance gradient histogram of the first local area, and selects the luminance gradient histogram of the second local area, having the lowest degree of similarity indicated by the similarity from among the luminance gradient histograms of the plurality of second local areas.

5. An image processing method for an image processing apparatus that includes
first distribution calculation means that calculates a distribution of luminance gradient vectors in a first local area that includes a feature point on an image;
second distribution calculation means that calculates distributions of the luminance gradient vectors in second local areas close to the feature point on the image;
selection means that compares the distribution of the luminance gradient vectors of the first local area with the distributions of the luminance gradient vectors of the second local areas to select the distribution of the luminance gradient vectors of the second local area of which the distribution is most different from the distribution of the luminance gradient vectors of the first local area from among the distributions of the luminance gradient vectors of the plurality of second local areas; and
feature descriptor calculation means that calculates a feature descriptor at the feature point on the basis of the distribution of the luminance gradient vectors of the first local area and the distribution of the luminance gradient vectors of the second local area selected by the selection means, the image processing method comprising the steps of:
calculating a distribution of the luminance gradient vectors of the first local area using the image by the first distribution calculation means;
calculating distributions of the luminance gradient vectors of the second local areas using the image by the second distribution calculation means;
selecting the distribution of the luminance gradient vectors of the second local area, of which the distribution is most different from the distribution of the luminance gradient vectors of the first local area by the selection means; and
calculating a feature descriptor at the feature point using the feature descriptor calculation means.

6. A non-transitory computer readable storage medium having stored thereon a program for causing a computer to execute a process comprising the steps of:
calculating a distribution of luminance gradient vectors in a first local area that includes a feature point on an image;
calculating distributions of the luminance gradient vectors in second local areas close to the feature point on the image;
comparing the distribution of the luminance gradient vectors of the first local area with the distributions of the luminance gradient vectors of the second local areas to select the distribution of the luminance gradient vectors of the second local area of which the distribution is most different from the distribution of the luminance gradient vectors of the first local area from among the distributions of the luminance gradient vectors of the plurality of second local areas; and
calculating a feature descriptor at the feature point on the basis of the distribution of the luminance gradient vectors of the first local area and the distribution of the luminance gradient vectors of the selected second local area.

7. An image processing apparatus comprising:
a first distribution calculation unit that calculates a distribution of luminance gradient vectors in a first local area that includes a feature point on an image;
a second distribution calculation unit that calculates distributions of the luminance gradient vectors in second local areas close to the feature point on the image;
a selection unit that compares the distribution of the luminance gradient vectors of the first local area with the distributions of the luminance gradient vectors of the second local areas to select the distribution of the luminance gradient vectors of the second local area of which the distribution is most different from the distribution of the luminance gradient vectors of the first local area from among the distributions of the luminance gradient vectors of the plurality of second local areas; and
a feature descriptor calculation unit that calculates a feature descriptor at the feature point on the basis of the distribution of the luminance gradient vectors of the first local area and the distribution of the luminance gradient vectors of the second local area selected by the selection unit.

* * * * *